UNITED STATES PATENT OFFICE.

FRANK GEORGE CURTIS, OF EVERETT, MASSACHUSETTS, ASSIGNOR TO THE AUTOMATIC ELECTRIC PUMP COMPANY, OF BOSTON, MASSACHUSETTS.

COMPOSITION FOR EXCITING FLUID FOR ELECTRICAL BATTERIES.

SPECIFICATION forming part of Letters Patent No. 650,305, dated May 22, 1900.

Application filed August 21, 1899. Serial No. 727,974. (No specimens.)

*To all whom it may concern:*

Be it known that I, FRANK GEORGE CURTIS, a citizen of the United States, residing at Everett, in the county of Middlesex and State of Massachusetts, have invented new and useful Improvements in Composition for Exciting Fluids for Electrical Batteries, of which the following is a specification.

My invention relates to a composition for use in the cell of electrical batteries in which the zinc electrode is immersed. It is especially adapted for use in batteries of the Bunsen type, and its great value resides in its economy and efficiency. The electrode immersed in the composition is preferably zinc.

In preparing the solution I take thirty gallons of water and add sulfuric acid to it until its specific gravity reaches 1.2. After cooling I add thereto one pound of carbonate of ammonium, one-half pound of carbonate of sodium, and one-half pound of bisulfate of mercury. When using the same, I dilute with four parts of water.

The addition of the carbonates of ammonium and sodium to the sulfuric acid forms, respectively, sulfate of ammonium and sulfate of sodium. It is obvious, therefore, that corresponding proportions of these salts might be added to the sulfuric acid direct.

Having described my invention, what I claim is—

A composition for use in the cell of electrical batteries in which the zinc electrode is immersed consisting of sufficient sulfuric acid to make the specific gravity of thirty gallons of water 1.2, sulfate of ammonium about one and three-eighths pounds, sulfate of sodium about two-thirds of one pound, and bisulfate of mercury one-half pound, as specified.

In testimony whereof I have hereunto set my hand in presence of two subscribing witnesses.

FRANK GEORGE CURTIS.

Witnesses:
 ELMAR A. HESSINGER,
 D. FOSTER FARRAR.